United States Patent [19]

Delersjö

[11] Patent Number: 4,815,649
[45] Date of Patent: Mar. 28, 1989

[54] METHOD OF UNDERWATER JOINTING AND REPAIR OF PIPELINES

[76] Inventor: Jan Delersjö, Pl, 3498, Onsala, Sweden

[21] Appl. No.: 672,264
[22] PCT Filed: Mar. 2, 1984
[86] PCT No.: PCT/SE84/00074
  § 371 Date: Oct. 30, 1984
  § 102(e) Date: Oct. 30, 1984
[87] PCT Pub. No.: WO84/03547
  PCT Pub. Date: Sep. 13, 1984

[30] Foreign Application Priority Data
Mar. 7, 1983 [SE] Sweden .................... 8301219

[51] Int. Cl.⁴ .................... B23P 3/09; B23K 20/08
[52] U.S. Cl. .................... 228/107; 228/108; 228/109
[58] Field of Search .............. 228/107, 108, 109, 126, 228/131

[56] References Cited

U.S. PATENT DOCUMENTS

| | | | |
|---|---|---|---|
| 2,367,206 | 1/1945 | Davis | 228/107 |
| 3,503,110 | 3/1970 | Berry | 228/108 |
| 3,578,233 | 5/1971 | Meister | 228/107 |
| 3,672,035 | 6/1972 | Lieberman | 228/107 |
| 4,231,506 | 11/1980 | Istvanffy | 228/109 |

FOREIGN PATENT DOCUMENTS

| | | | |
|---|---|---|---|
| 4313545 | 7/1968 | Japan | 228/107 |
| 1010859 | 11/1965 | United Kingdom | 228/109 |
| 1394819 | 5/1975 | United Kingdom | 228/107 |
| 2098116 | 11/1982 | United Kingdom | 228/107 |

OTHER PUBLICATIONS

Pipe to Pipe Welding by Explosives; M. D. Chadwick; *Explosive Welding*, 1976, pp. 31–33.
*Modern Metals;* Explosive Joining of Al. Pipe, Oct. 1962, p. 84.

Primary Examiner—Kurt Rowan
Attorney, Agent, or Firm—Nies, Webner, Kurz & Bergert

[57] ABSTRACT

At the jointing of pipelines (3), especially underwater, as well as at the repair of damaged portions, a jointing piece (1) must be inserted because the two pipe ends (5) cannot entirely be jointed with precision. The invention proposes an explosive welding method with two explosive charges (2), by which method such a jointing piece (1) can be welded-in rapidly and simply and the joint can be checked from the outside of the pipe.

3 Claims, 1 Drawing Sheet

METHOD OF UNDERWATER JOINTING AND REPAIR OF PIPELINES

Pipelines laid on the sea-bottom normally are jointed above the water surface on special laying vessels as the pipeline is being laid.

In certain cases, however, for example when pipelines laid from different vessels are to be jointed, in the vicinity of platforms etc., the jointing operation must be carried out underwater on the sea-bottom.

In one known method a special jointing rig is lowered from a vessel. The rig is provided with means for handling and fixing the pipe ends and with a habitat, which is mounted over the place of jointing. The water about the joint can be removed by means of sealings within the pipes and about the same at their entrance into the habitat. The technical staff working in the habitat can hereby dry-weld the joints.

This process requires a highly qualified staff in respect of both diving and welding.

It takes two workers about 16 hours to carry out such a jointing operation. In the case of great depths, besides, the work cannot be carried out in one stretch by the same workers during such a long diving time, but the workers have to be exchanged. The expenditures, therefore, are very high.

Pipelines can be jointed by different known methods of explosive welding, on land as well as underwater. No known type of underwater joint, however, hetertofore has been carried out so as to be approved by the checking authorities or so as to be economically acceptable.

The present invention proposes a method of underwater explosive welding, at which the deficiencies of conventional methods have been eliminated by various measures. Substantial economic advantages have been achieved by radically reducing the necessary diving time, and a considerable safety gain against leakage has been made by the combination of welded and mechanical weld.

The handling of the pipe ends always requires a jointing rig with cranes for lifting the pipes and moving them into a position suitable for their jointing. When pipelines are to be jointed or repaired on the sea-bottom, the pipe lengths to be handled usually are very long.

It is, therefore, difficult and in many cases impossible to move the pipes in axial direction so as to accurately fit each other. After the habitat has been positioned, and the pipes are sealed against the same, axial movement is not possible at all, because this would give rise to leakage.

According to the invention, however, a jointing piece of a definite length is used, which prior to the explosive welding is dimensioned so that it can be threaded on the outside of one pipe end before the pipe is fixed in the rig. When the pipe ends have been fixed so that the central axes of the pipe ends align, the pipes are cross-cut so that a predetermined distance between them is obtained, which is adjusted to the jointing pipe. The said distance is such that the pipe ends only partially project into the jointing piece which, thus, constitutes a connecting pipe between the two pipe ends. Sealings, for example in the form of inflatable bags of plastic or rubber are inserted into each pipe end. The pipe ends, which can be cut straight or with bevel edge, are ground outwardly about the circumference in a zone of about 100 mm width nearest to the edges. These zones from joint surfaces at the explosive welding and, therefore, must be ground to a surface quality of $Ra = 2.5$ $\mu$m. The explosive charges to be used at the welding are entirely encased and provided with an ignition system so designed that the charges are initiated simultaneously about their inner circumference. This is necessary for obtaining a seal weld all about.

The invention is characterized in that two identical explosive charges are used, which are positioned within the respective pipe end and connected to an ignition system causing the two charges to detonate accurately at the same time.

When both explosive charges have been positioned, the jointing pipe is moved so as to overlap both pipe ends. When the work is carried out in a habitat of a size sufficient for the workers to stay therein, the sealing and the removal of water in the habitat and pipe ends advantageously is effected so that all operations from cutting-off and grinding can take place in dry environment, which facilitates the work and also renders possible complete control of the joint surfaces to be free from dirt and water. According to a preferred embodiment, when the jointing or repair work is carried out underwater in a habitat, the pipes are sealed against the jointing piece, and the pipes are sealed internally at the pipe ends. Thereafter the water is removed from the joint surfaces to be explosive welded, in that the water is pumped out in the volume enclosing the jointing piece. The impulse to trigger the detonation must be transferred to the detonating cap within the jointing pipe. It is in principle per se possible to lay out thin insulation-painted conduit wires between the pipe ends and jointing pipe without jeopardizing the quality of the joint. It is safer, however, to transfer the impulse through the wall of the jointing piece inductively or by means of a shock wave.

Upon triggering of the explosive charges, the pipe ends are flung outward to the jointing piece and explosive welded thereon. The diameter of the pipe ends, thus, is widened so that the pipe ends are flanged out to abut the inner surface of the jointing piece and are welded thereon near the respective end of the jointing piece. The workers must be outside the habitat. At the detonation, the sealings in the pipe are destroyed. The habitat, however, is not filled with water, because the pipe then is sealed due to the two pipe ends having been welded on and jointed with the jointing pipe.

The weld joints now can be subjected to ultrasonic weld testing from the outside of the jointing pipe. It is obvious, that the same jointing method and process advantageously can be utilized above water, on board of ships or on land, in which case, of course, sealings within the pipe ends and the habitat are not required.

It is also possible to carry out the jointing operation without habitat, when sealings are applied within the pipe, and the outer rig after having been positioned is sealed at both ends and provided with supply conduits and drainage conduits for removing the water.

In the figures, 1 designates the jointing pipe, 2 the explosive charges, 3 the pipe ends and 4 the ignition system.

Figure 1:
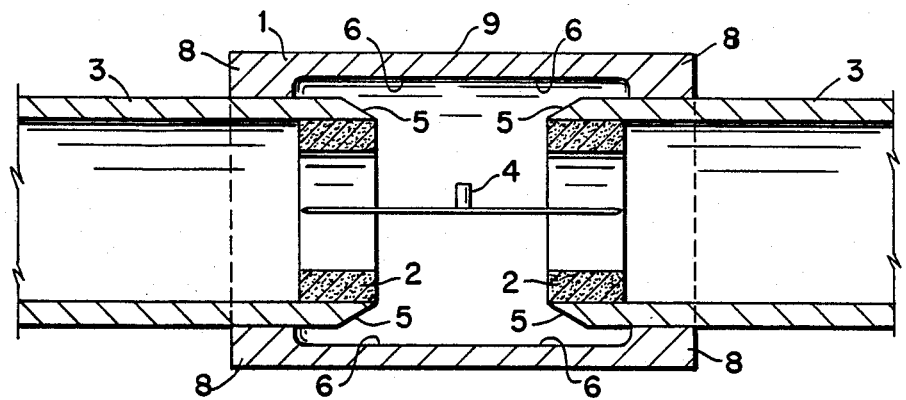
FIG. 1 shows schematically two pipe ends and an intermediate jointing piece.

In FIG. 1 the pipe ends are shown to have bevelled surfaces 5, which are to be explosive welded against the inner surface of the jointing piece at 6.

Figure 2:
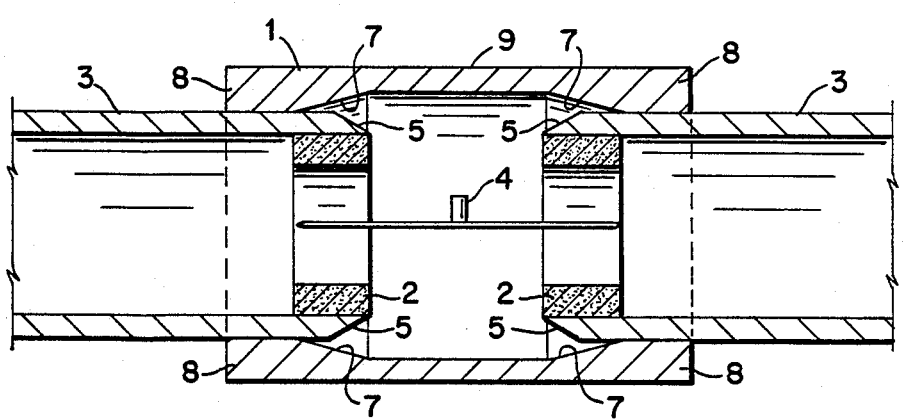
FIG. 2 shows an alternative embodiment of the prospective joint surfaces of two pipe ends and intermediate jointing piece.

In FIG. 2, in addition to bevelled pipe ends 5 also angular joint surfaces 7 of the jointing piece are shown, with which the bevelled adges 5 are intended to be jointed at the detonation.

According to a preferred embodiment, the jointing pipe is supported at the explosive welding by a fixture located on the outside.

As appears from FIGS. 1 and 2, the jointing piece is provided with flanges 8 at the ends. The inner diameter of the flanges must slightly exceed the outer diameter of the pipe ends. The jointing piece portion 9 located between said flanges 8 has a diameter exceeding that of the flanges 8 in order thereby to effect the pipe ends to be flanged out in the way described above at the detonation.

According to the invention, thus, both an explosion jointing and a mechanic jointing between pipe ends and jointing piece are effected, which is particularly advantageous in respect of the sealing and the strength resulting therefrom.

Although the jointing piece, even with advantage, can be permitted to assume a certain deformation at the explosive welding, because then also a certain mechanical joint is obtained, the dimension and material, of course, must be calculated so that no fracture occurs. Alternatively, an outer fixture can be applied which can be used repeatedly.

I claim:

1. A method of jointing or repairing pipelines by explosive welding using an annular jointing piece on the outside of the ends of the pipes to be jointed, whereafter the ends of said pipes are explosive welded against the jointing piece, characterized in that: the pipe ends are positioned in spaced apart relationship within the jointing piece, the jointing piece, in a manner known per se, is provided with radially inwardly projecting flanges at its respective ends, the inner diameter of the flanges corresponding to the outer diameter of the pipe ends, and said jointing piece having a greater inner diameter between said flanges than the inner diameter of the flanges, providing two explosive charges, one in each pipe end, and causing said two charges to detonate simultaneously to thereby cause both pipe ends to be simultaneously expanded towards and explosive welded against the inner wall and inside flange surfaces of the jointing piece, said expansion taking place in connection to and in the zone of greater inner diameter of said jointing piece between said flanges, whereby, in addition to the explosive welding, a mechanical joint between each expanded pipe end and the interior of the jointing piece is obtained.

2. A method as defined in claim 1, characterized in that the jointing pipe at the explosive welding is supported by a fixture located on the outside.

3. A method as defined in claim 1 or 2 to be used when the jointing or repair is carried out underwater in a habitat, characterized in that the jointing piece is sealed against the pipes, and the pipes are sealed internally at both ends, whereafter the water on the joint surfaces to be explosive welded is removed by pumping out the water in the volume enclosed by the jointing piece.

* * * * *